(12) United States Patent
Rebolloso et al.

(10) Patent No.: US 9,216,705 B2
(45) Date of Patent: Dec. 22, 2015

(54) MOUNTING DEVICE FOR AIRCRAFT SUPPLY SYSTEMS

(71) Applicant: AIRBUS OPERATIONS SAS, Toulouse (FR)

(72) Inventors: Laurent Rebolloso, Le Gres (FR); Michel Dal-Cin, La Salvetate Saint Gilles (FR)

(73) Assignee: Airbus Operations (SAS), Toulouse (FR)

( * ) Notice: Subject to any disclaimer, the term of this patent is extended or adjusted under 35 U.S.C. 154(b) by 55 days.

(21) Appl. No.: 14/152,370

(22) Filed: Jan. 10, 2014

(65) Prior Publication Data

US 2014/0197217 A1  Jul. 17, 2014

(30) Foreign Application Priority Data

Jan. 11, 2013  (FR) ...................................... 13 50272

(51) Int. Cl.
B60R 16/02 (2006.01)
H02G 3/32 (2006.01)
B64C 1/00 (2006.01)

(52) U.S. Cl.
CPC .............. B60R 16/0215 (2013.01); B64C 1/00 (2013.01); H02G 3/32 (2013.01)

(58) Field of Classification Search
CPC .................................................. B60R 16/0215
USPC .......... 224/570, 548–550, 403, 405; 248/200, 248/200.1, 298.1, 228.1, 354.5, 354.6; 410/105, 116, 143, 150, 151
See application file for complete search history.

(56) References Cited

U.S. PATENT DOCUMENTS

| | | | | |
|---|---|---|---|---|
| 3,698,678 A | * | 10/1972 | Bowers | 410/105 |
| 5,533,848 A | * | 7/1996 | Davis | 410/105 |
| 2007/0069093 A1 | * | 3/2007 | Graham et al. | 248/231.71 |
| 2010/0127128 A1 | | 5/2010 | Giavarini | |
| 2011/0309196 A1 | * | 12/2011 | Sabadie et al. | 244/131 |

FOREIGN PATENT DOCUMENTS

| | | |
|---|---|---|
| DE | 10 2009 022175 | 12/2010 |
| FR | 2 912 804 | 8/2008 |
| FR | 2 962 716 | 1/2012 |

OTHER PUBLICATIONS

Search Report for FR 1350272 dated Sep. 13, 2013.

* cited by examiner

*Primary Examiner* — Justin Larson
*Assistant Examiner* — Phillip Schmidt
(74) *Attorney, Agent, or Firm* — Nixon & Vanderhye P.C.

(57) ABSTRACT

A mounting device for aircraft supply systems comprises a cross member and at least one support module including a body having a shape complementary to that of a cross member. The body includes a structure for securing an aircraft supply system, an opening, and a pin, wherein the opening forms a guide that is able to receive a portion of the pin. The cross member includes grooves that are regularly spaced apart in the direction of elongation of said cross member. The pin has a shape complementary to that of the grooves and has a lip transverse to the direction of elongation of the pin. The support module is anchored to the cross member by the pin being inserted into the opening, the pin engaging with one of the grooves, as far as an anchoring position in which the lip is in contact with the support module.

14 Claims, 7 Drawing Sheets

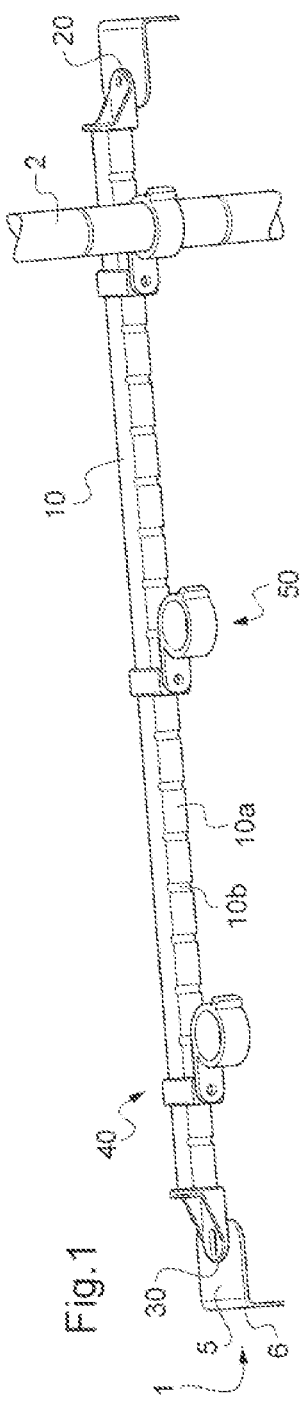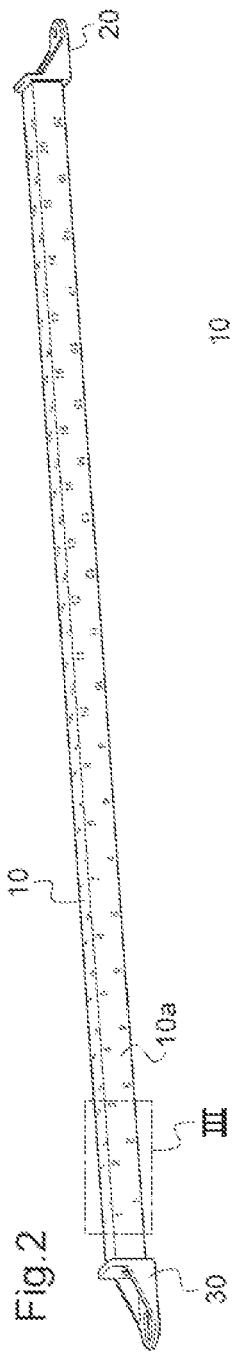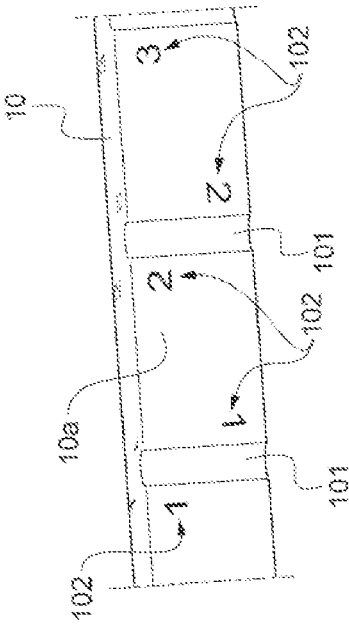

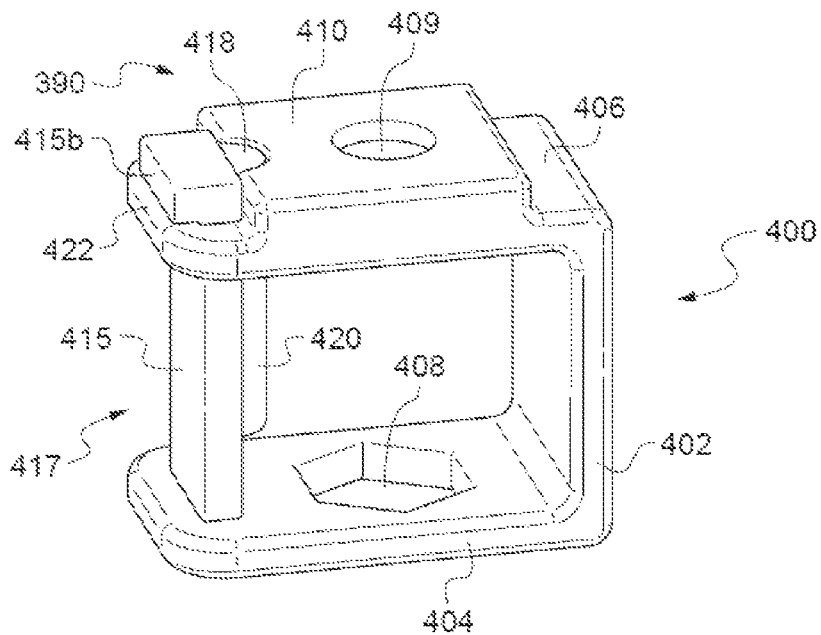
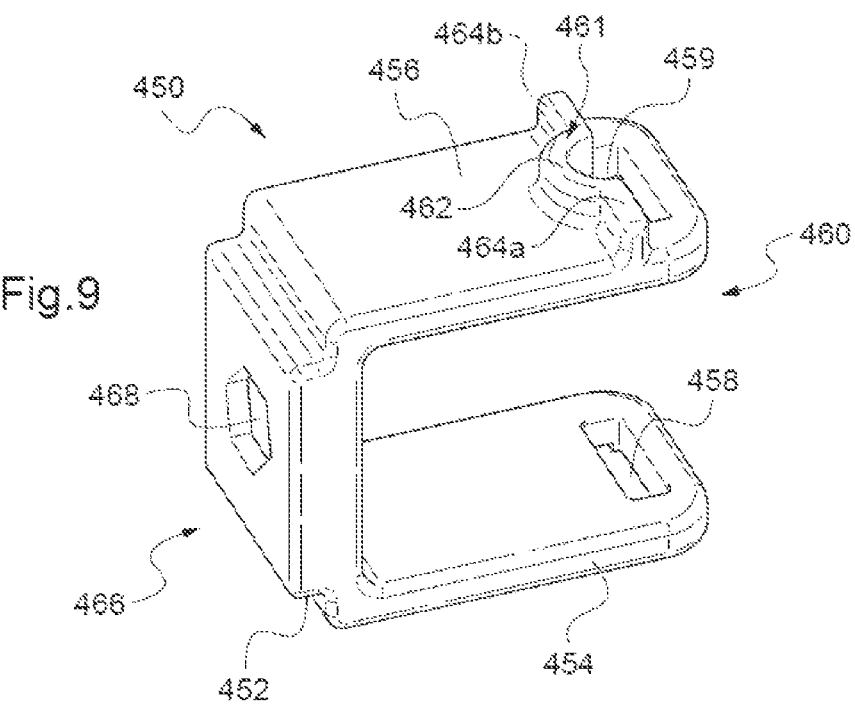

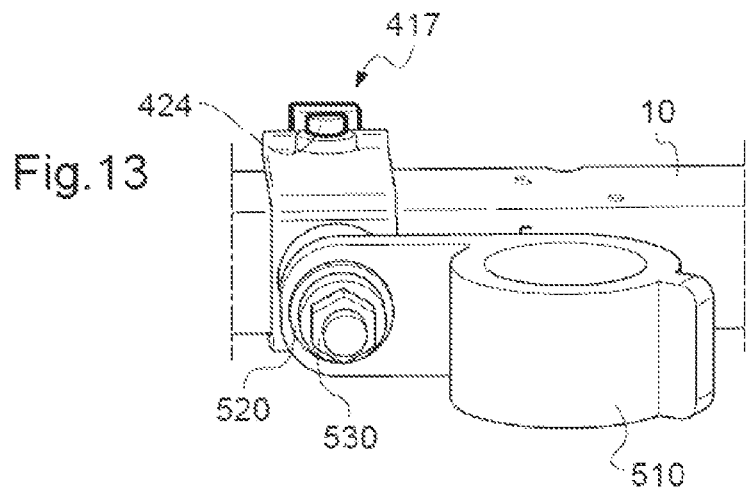
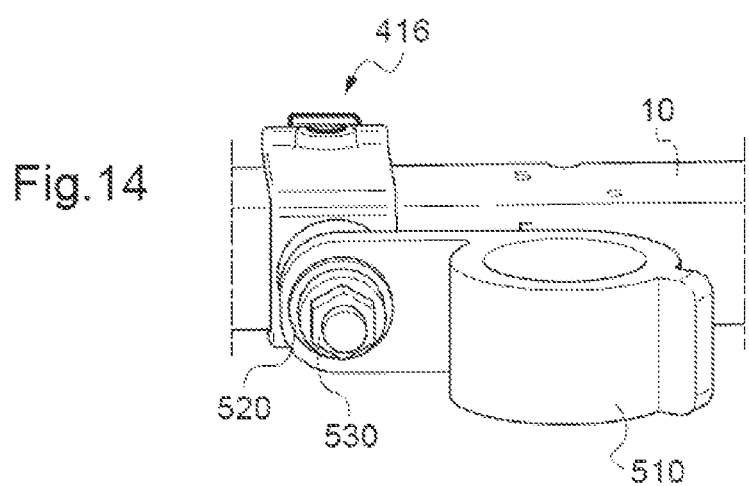
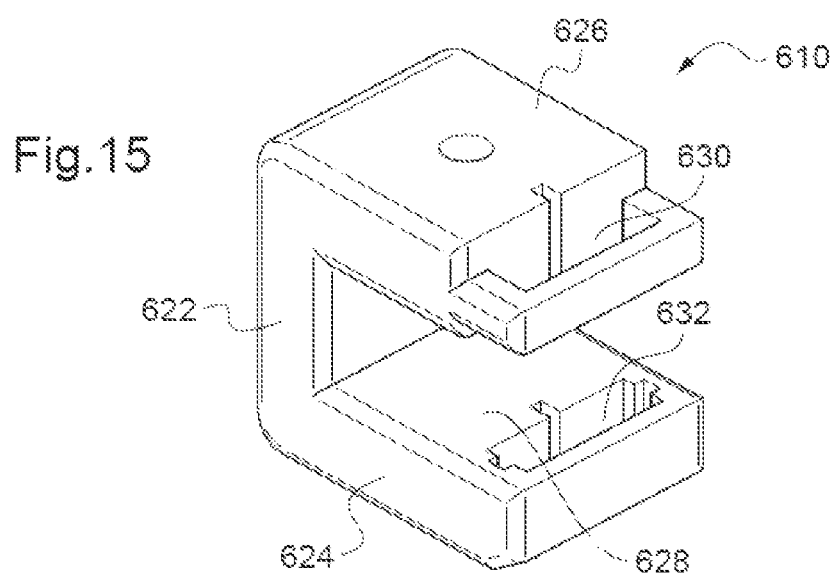

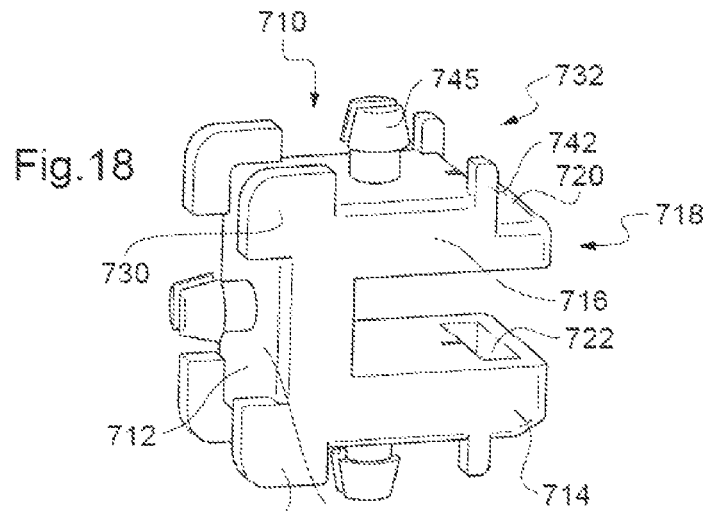
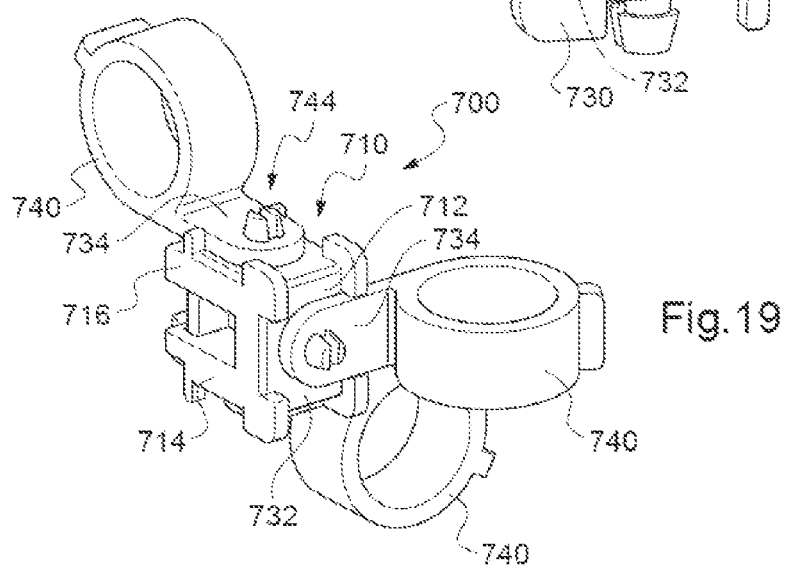
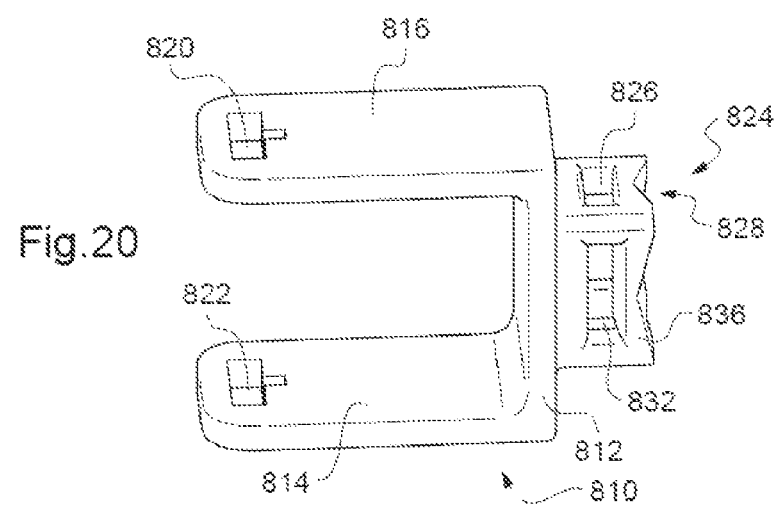

MOUNTING DEVICE FOR AIRCRAFT SUPPLY SYSTEMS

This application claims priority to French Patent Application No. 20130050272 filed 11 Jan. 2013, the entire contents of which are hereby incorporated by reference.

BACKGROUND OF THE INVENTION

1. Field of the Invention

The invention relates to a device for mounting aircraft supply systems.

2. Discussion of Prior Art

In order to supply the various systems present in an aircraft, it is necessary to mount the associated (electric, hydraulic, pneumatic, etc.) supply systems. These supply systems are in the form of wiring, pipes and other pathways. They are arranged on the fuselage structure, in particular between the frames which hold the fuselage structure, in the plane of its section. These frames are connected to a reinforcement along the longitudinal axis of the aircraft, provided by stringers. Since the space available for installing the supply systems is located mainly in the region of the stringers and the panels forming the airplane skin, this volume is decisive for the installation of the systems in the pressurized cabin.

The pipes, wires, wire assemblies, electrical harnesses or strands are thus mounted on the frames above the stringers of the fuselage with the aid of a mounting device having a cross member (or rod) which connects two frames or two stringers together. Such a mounting device has lugs attached to the cross member, clamping collars that receive one or more wires being engaged in said lugs. These lugs and clamping collars are separated by a spacing (fixed distance) which depends intrinsically on the type of aircraft in question.

The major drawback of these prior art devices is that they do not benefit from any standardization. This is because each aircraft has a spacing between the supply systems which is specific to said aircraft. Now, the mounting devices of these systems are not adaptable in any way: it is frequently impossible, at the present time, to use one and the same mounting device for any kind of aircraft. Furthermore, including for one and the same aircraft, it is necessary to produce a new mounting device each time the spacing between the supply systems changes, for whatever reason. As a result, these mounting devices are not covered by any standard.

There are thus a large number of references associated with these mounting devices, and this proves to be problematic for the manufacture, storage, handling, etc., thereof. The above-mentioned problems thus make in particular the management of the logistic chain of the parts of the aircraft more complex, generating additional costs and delays in delivering the apparatus.

Furthermore, these mounting devices, in particular the cross members, are very frequently produced from metal materials such that new cross members can be rapidly manufactured upon each modification in the spacing. The use of metal materials also proves to be detrimental on account of the intrinsic increase in the weight of the aircraft and thus the operating costs thereof.

US 2010/0127128 A1 (published on May 27, 2010) discloses a device for mounting equipment on a structural framework of a vehicle, comprising fasteners, fastener supports and rails. The fastener supports presented in said document comprise an elastic clip for securing them to the rails. Such a device has the drawback that the fastener supports are secured only weakly to the rails. Specifically, the fastener supports may, once positioned, move laterally in a longitudinal direction of the rail under the effect of a vibration or an impact, for example. Furthermore, it is easy for an operator to accidentally move or remove the fastener supports.

The spacing between the equipment (supply systems) is thus potentially not kept constant, and this can prove detrimental in particular when said equipment consists of electrical wires: the segregation distances, as they are known, are then not respected. It will be noted here that a segregation distance corresponds for example to the distance that should separate two electrical wires in order to limit the effects due to electromagnetic interference.

Finally, the prior art device presented is not particularly easy to use in as much as, in order to secure a fastener support to the rails, it is necessary to lock the elastic clip of the fastener support in position with the aid of a clasp, a portion of which is wedged in an opening made in the wall of the fastener support, this operation being very complex for an operator.

The invention proposes remedying at least one of the above drawbacks.

SUMMARY OF THE INVENTION

To this end, the present invention relates to a device for mounting aircraft supply systems, comprising a cross member and at least one support module, said support module comprising, on the one hand, a body having a shape complementary to the shape of the cross member, the body comprising means for securing an aircraft supply system and an opening, and, on the other hand, a pin, the opening being able to receive a portion of the pin.

It is characterized in that the cross member comprises grooves that are regularly spaced apart in a longitudinal direction of the cross member, the pin having a shape complementary to that of the grooves and having a lip transverse to the direction of elongation of the pin. The support module is anchored to the cross member by the pin being inserted into the opening, the pin engaging with one of the grooves, as far as an anchoring position in which the lip is fully in contact with the support module.

Such a mounting device has the advantage of having great adaptability, in other words of being able to be adapted to numerous possible spacings between the supply systems. Specifically, in order to modify the spacing between supply systems, all that is necessary is to move from one groove to the other in the longitudinal direction of the cross member, the support modules comprising means for securing a supply system.

It is thus possible to use the mounting device according to the invention in all types of aircraft and, in one and the same aircraft, to change the spacing between supply systems without having to design or produce a new mounting device for these supply systems. In this way, the invention provides the possibility of creating a standard for the devices for mounting supply systems. Consequently, the various existing references would be bound to disappear in favour of a single reference, making it considerably easier to manage the logistic mounting chain of aircraft.

Another advantage of the device lies in the fact that it provides high mounting security, since once a support module has been anchored on the cross member, lateral movements, in other words movements in the longitudinal direction of the cross member, are blocked. This is on account in particular of the shape complementarity of the grooves produced in the cross members and the pins making it possible to anchor a support module on the cross member. Specifically, once the pins have been inserted into the grooves, they are prevented from undergoing translational movement in the longitudinal direction of the cross member, and a support module can thus no longer be moved in this direction.

When the supply systems are electrical wires, this advantage has the further consequence of ensuring that minimum distances, or segregation distances, are maintained between these electrical wires. Since the support module is anchored by simple insertion of the pin into the opening in the support module and the groove, the operations of mounting the device are likewise particularly simple and economical. Finally, this choice makes it possible to avoid mounting errors, since the pins can be inserted in only one direction.

In order to make the mounting device more secure, the pin comprises locking means that engage with the support module so as to prevent the translational movement of the pin in the opening into the anchoring position. This makes it possible in particular to prevent accidental removal of the pin, which would have the consequence of causing the support module to fall. In one particular embodiment, once it is in the anchoring position, the pin cannot be removed from the opening without being broken.

According to one possible feature, the locking means are a pair of flexible hooks located at one end of the pin and designed to deform during their insertion into the opening and to return to their initial shape upon leaving the opening. These are locking means that are easy to manufacture and use. In order to accelerate mounting, and to prevent any errors, the grooves are numbered on surfaces of the cross member.

According to one possible feature, a support module comprises a plurality of securing means. This makes it possible in particular to secure a plurality of supply systems to one and the same module, for example with a view to saving space or weight.

According to one possible feature, the device also comprises a first and a second end piece respectively engaging with ends of the cross member and comprising holes intended to secure them to a structural element of the aircraft, the hole in said first end piece being circular and the hole in said second end piece being elongate. The shape of the elongate hole participates in the adaptability of the mounting device since it allows greater flexibility in securing of the cross member. In particular, it is possible to create play in the securing, or else greater flexibility in the mounting, the precision of which does not have to be too great, in particular with regard to the dimensions and/or distances between elements to be provided.

According to one possible feature, with the cross member having a hollow closed section, for example a rectangular section, the body of the support module is composed of a base from which two arms extend so as to form an approximate C shape. This is one of the simplest shapes that can be given to the body, given the conventional shapes of cross members. Thus, the costs of mounting and manufacturing the body are minimized once again.

According to one possible feature, the opening passes right through the arms of the body. In order to simplify the mounting of the device and to be able to adapt to all types of clamping elements of already existing supply systems, the securing means comprise at least one perforation, at least one screw engaging with said at least one perforation, and at least one intermediate device for holding aircraft supply systems, slipped onto said at least one screw. More particularly, the intermediate device for holding aircraft supply systems is a clamping collar. Advantageously, a plurality of intermediate devices for holding aircraft supply systems are slipped onto said at least one screw.

In an alternative embodiment, the securing means are a structure projecting from the body and forming a guide for the supply system. In this case, it is not necessary to provide an intermediate system for clamping the supply system, which may be secured directly to the structure. In order to ensure that the mounting device is electrically insulated and thus to increase safety in the course of mounting and during flights, the cross member comprises an outer layer produced from materials which are not electrically conductive.

In one particular embodiment, a device made of composite materials may be favoured, so as to reduce its overall weight. In this latter case, the cross member may be produced by pultrusion, a process which is simple and inexpensive.

The invention finally relates to an aircraft comprising a mounting device according to the invention.

BRIEF DESCRIPTION OF THE DRAWINGS

Further features and advantages will become apparent from the following description, which is given by way of non-limiting example and with reference to the appended drawings, in which:

FIG. 1 is a schematic perspective illustration of a first embodiment of a mounting device according to the invention;

FIG. 2 is a schematic perspective illustration of a cross member of the mounting device from FIG. 1;

FIG. 3 is a detail of the cross member from FIG. 1;

FIG. 8 is a schematic perspective illustration of the module body from FIG. 6 and the pin from FIG. 7 joined together;

FIG. 9 is a schematic perspective illustration of the body of the module of the mounting device from FIG. 1;

FIG. 13 is a schematic perspective illustration of the mounting device from FIG. 1, which is mounted incorrectly;

FIG. 14 is a schematic perspective illustration of the mounting device from FIG. 1, which is mounted correctly;

FIG. 15 is a schematic perspective illustration of the body of a module in a second embodiment according to the invention;

FIG. 18 is a schematic perspective illustration of a module body in a third embodiment according to the invention;

FIG. 19 is a schematic perspective illustration of a module and means for securing a supply system in a third embodiment according to the invention; and FIG. 20 is a schematic perspective illustration of a module body in a fourth embodiment according to the invention.

DETAILED DISCUSSION OF EMBODIMENTS

Figure 4:
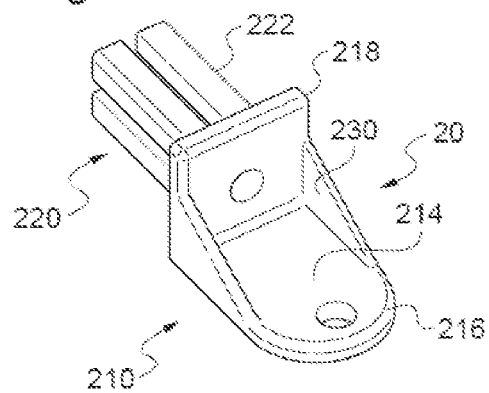
FIG. 4 is a schematic perspective illustration of a first end piece of the cross member from FIG. 1.

FIG. 1 shows a device 1 for mounting aircraft supply systems 2 according to a first embodiment of the invention, said device being secured to two faces 5 of the support bracket 6 of the structure of an aircraft. Since these support brackets 6 are known from the prior art and are not an integral part of the invention, their structure will not be described here.

The mounting device 1 is composed of a cross member (ramp) 10, of a first end piece 20, of a second end piece 30 and of support modules 40. Intermediate devices 50 for holding supply systems, which are fixed to the modules 40, are also shown. In this case, these are collars from the prior art. As such, they will not be described in detail here.

As can be seen from FIG. 2, which shows only the cross member 10 and the first and second end pieces 20 and 30, the cross member 10 is a part which extends in a longitudinal direction and has a rectangular section. Nevertheless, it may have other sections, for example a circular section, a triangular section, etc. Closed sections will be favoured in order to simplify the anchoring of the support modules 40. It will be noted in this respect that the rectangular section is a preferred embodiment of the invention, since it makes it possible in particular to make grooves in the cross member 10 in a simple manner industrially.

In any case, the cross member 10 is preferably hollow so as to reduce the weight of the structure of the aircraft in which it is placed. More particularly, the inner layer of the cross member may be produced from a material which is both light and rigid such as carbon fibres, Kevlar fibres or aluminium fibres. This inner layer may be covered with an outer layer made of an electrically insulating material, such as glass fibres, nylon fibres, rubber fibres or polyether ether ketone (PEEK) fibres. Furthermore, the fact that the cross member 10 is hollow makes it possible to insert the first end piece 20 and the second end piece 30 into said cross member 10, respectively at each of the ends thereof, said end pieces in this way securing the cross member 10 to each of the two support brackets 6 shown in FIG. 1.

As can be seen in FIGS. 1 to 3, the cross member also comprises grooves 101 distributed in the longitudinal direction of the cross member. Preferably, the grooves 101 are distributed regularly in the longitudinal direction. The distance selected between the grooves may for example be a segregation distance for an electrical supply system. The grooves 101 have a semicircular shape, that is to say are gutter-shaped. However, it is conceivable for them to have a different shape, for example a square or triangular shape. Given the particular embodiment shown in FIGS. 1 and 2, the grooves 101 are made flush with the front face 10a of the cross member which is perpendicular to the surface of the support bracket 6 to which the cross member 10 is secured. As will be described in more detail hereinbelow, these grooves 101 make it possible to anchor support modules 40 to the cross member 10.

In FIG. 1, three support modules 40 are anchored into three of the grooves 101, but it goes without saying that the number of support modules shown is only an example and it is only limited by the number of grooves 101, adaptable depending on needs, as is the value of their spacing. In order to make it easier to mount the support modules 40, the grooves 101 are numbered, as can be seen in FIG. 3. In the particular embodiment shown in this figure, the cross member 10 has, for each groove 101, a pair of numbers 102 located on each of the faces of the cross member 10, i.e. eight numbers for a cross member having a rectangular section. This allows the handler or fitter to see the numbers from several angles.

Furthermore, the numbers of each pair are disposed head to tail so that they can be read, on each face, from different angles. The identification of the grooves 101 has the advantage of preventing a mounting error during the securing of the support modules and/or the supply systems, but also of simplifying it and thus of reducing the time it takes and thus the associated costs.

Figure 5:
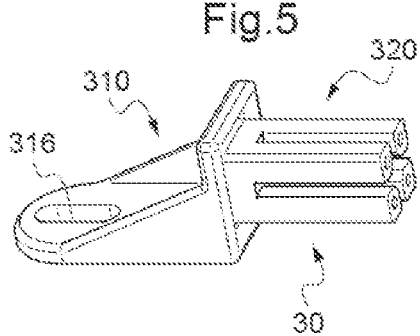
FIG. 5 is a schematic perspective illustration of a second end piece of the cross member from FIG. 1.

The first and second end pieces 20 and 30 will now be described in more detail with reference to FIGS. 4 and 5. As can be seen in FIG. 4, the first end piece 20 is composed of a bracket 210 and a male connector 220. The bracket 210 comprises both a semi-elliptical base 214 and a rectangular base 218. They are additionally connected together by struts 230 that extend from their respective lateral edges. The male connector 220 projects, in a manner normal to its surface, from the centre of the rectangular base 218. This male connector 220 comprises four identical prongs 222 which have a rectangular section and are intended to be inserted into the cross member 10 at one of its ends. The prongs 222 are in particular hollow at their centre and are produced from an electrically insulating material, as is the entirety of the first end piece 20.

The semi-elliptical base is, for its part, perforated by a circular hole 216 which is intended to receive bolts, screws or any other securing means that make it possible to connect it to the support bracket 6, or any other element of the fuselage structure for which the support device 1 is intended. The second end piece 30, shown in FIG. 5, is also composed of a second bracket-type base 310 and a second male connector 320. The second bracket-type base 310 differs from the first bracket-type base 210 in that it is perforated by an elongate, non-circular hole 316. The second male connector 320, for its part, is identical to the first male connector 220. Its shape and its material are identical.

The shape of the elongate hole 316 participates in the adaptability of the mounting device 1 since it allows greater flexibility in securing of the second end piece 30 and thus of the cross member 10. Furthermore, the first and second end pieces 20, 30 are preferably each secured in a different orientation, for example through a rotation of 180° with respect to one another so as to prevent the rotation of the cross member 10 about its direction of elongation.

Figure 6:
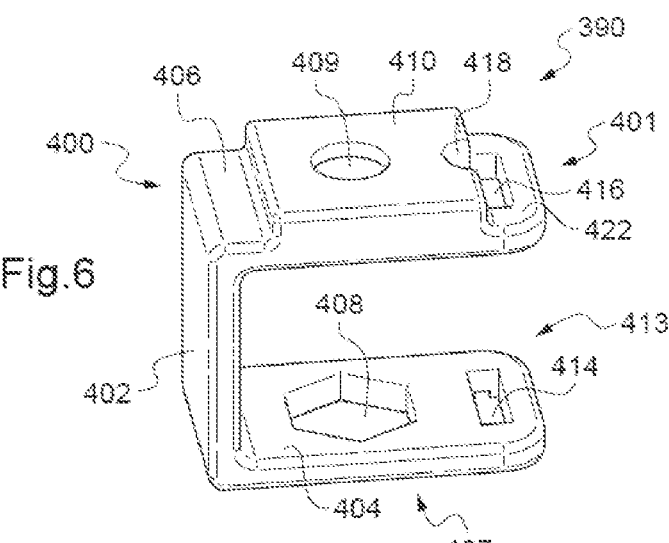
FIG. 6 is a schematic perspective illustration of a module body according to one embodiment of the invention.

Various embodiments of support modules will now be described in detail with reference to FIGS. 6 to 20. FIG. 6 shows a first embodiment of a support module 390. It comprises a body 400 and means 401 for anchoring the body 400 to a cross member. The body 400 is in the form of a jaw similar to a C, so as to enclose three of the four faces of the cross member 10. For this purpose, it comprises a web 402 and also a lower arm 404 and an upper arm 406 which each extend from one end of the web 402. Each arm forms an approximately right angle with the web 402. These three elements combined form the jaw. It will be noted that the terms "lower" and "upper" are only in relation to the orientation of the body 400 in FIG. 6 and do not predict in any way the position of the module 40 on the cross member 10.

Figure 11:
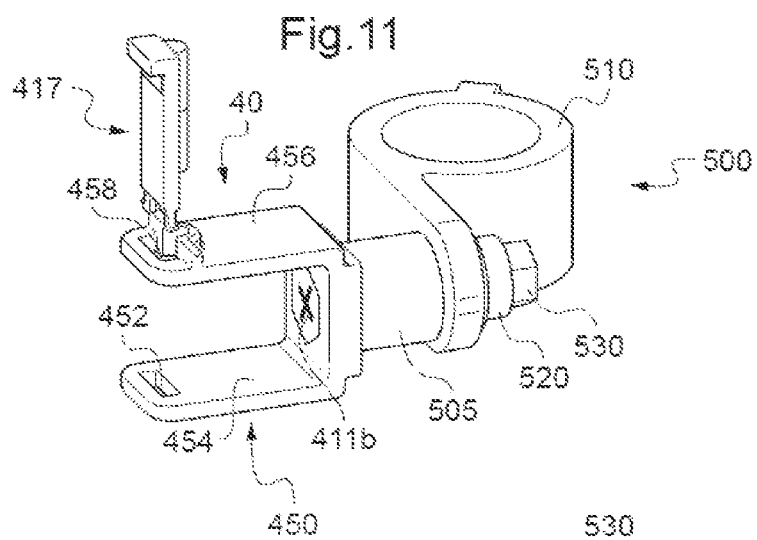
FIG. 11 is a schematic perspective illustration of the elements from FIG. 10 joined together.

The body 400 is provided, through the lower arm 404 and upper arm 406, with means 407 for securing an aircraft supply system. In this first embodiment of the module 390, these securing means 407 are composed, on the one hand, of a hexagonal aperture 408 in the lower arm 404 and, on the other hand, of an orifice 409 in the upper arm 406. The orifice 409 is intended for the passage of the shank of hexagon head bolt 411 (shown for example in FIG. 10) with the head recessed into web 448 (as shown in FIG. 11). In this regard, the shape of the orifice may of course vary, if the choice is made to use a bolt having a different head, or some other securing means.

The hexagonal aperture 408, which is opposite the orifice 409 in the upper arm 406, has the function of allowing the head of hex bolt 411 to pass through with a hexagonal inner lip on orifice 409 receive the head and in particular prevents the bolt head from rotating once it has been inserted through aperture 408 and is seated in orifice 409.

The C-shaped body 400 also includes an opening 413 passing right through it. This opening 413 consists of a lower slot 414 and an upper slot 416, which are perforated respectively in the lower arm 404 and the upper arm 406. The lower slot 414 is made at that end of the lower arm 404 that is opposite the web 402. It has a rectangular shape since it is intended for the passage of a prong 415, having a rectangular section, of a pin 417 shown in FIGS. 7a and 7b. The upper slot 416, too, is made at that end of the upper arm 406 that is opposite the web 402. The upper slot 416 is positioned opposite the lower slot 414 and also has a rectangular shape since it is intended for the passage of the pin 417 which passes right through it.

The projection 410 of the upper arm 406 also comprises, flush with the upper slot 416, a semicircular notch 418. The semicircular notch 418 is intended for the passage of the semicylindrical shank 420 of the pin 417. The semicylindrical shank 420 can slide inside the semicircular notch 418 through the entire thickness of the upper arm 406.

Figure 7A:
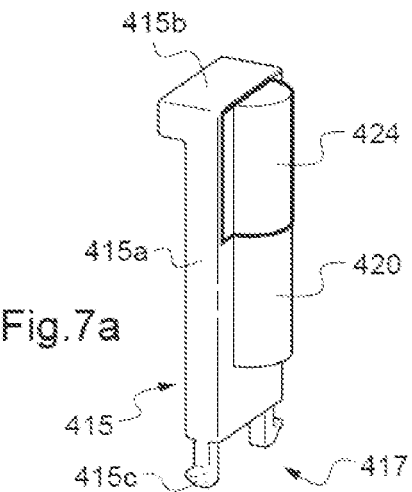
FIG. 7a is a schematic perspective illustration of a pin according to one embodiment of the invention.
Figure 7B:
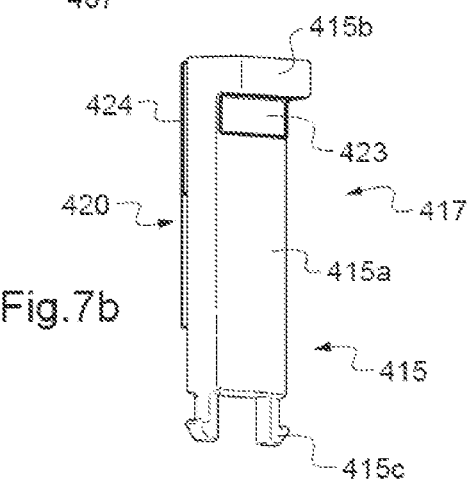
FIG. 7b is a schematic perspective illustration of the pin from FIG. 7a from a different angle.
Figure 10:
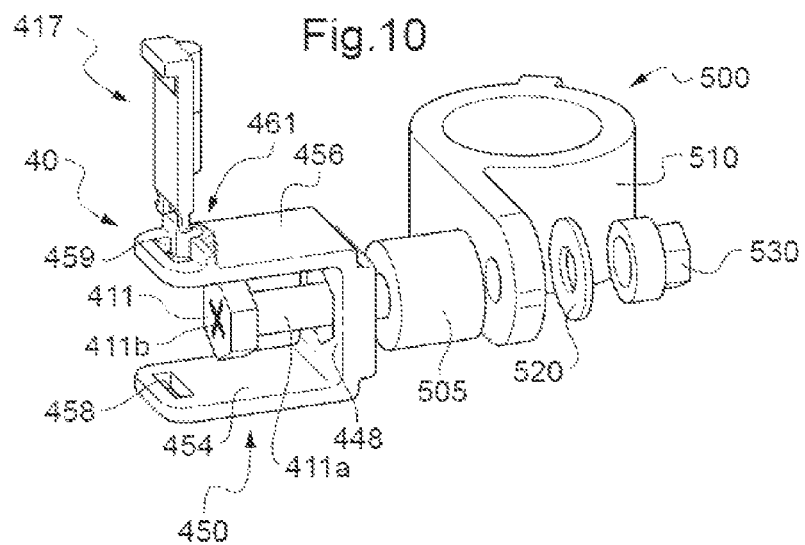
FIG. 10 is an exploded view of elements of the mounting device from FIG. 1.

The pin 417 will now be described in more detail with reference to FIGS. 7a and 7b, and also the way in which it engages with the body 400 with reference to FIG. 8. The pin 417 comprises a prong 415 having a rectangular section, and a semicylindrical shank 420 resting thereon. The prong 415 comprises a central parallelepipedal part 415a, at a first end of which a lip 415b is located. As can be seen from FIG. 8, the lip 415b, once the pin 417 has been fully inserted into the opening 413, rests against the free edge 422 (the one furthest away from the base 402) of the upper arm 406. It will be noted that the central part 415a may have, on its rear face, that is to say on the face on which the semicylindrical shank does not rest, a marking 423 below the lip 415b in order to help fit the pin 417 in the opening 413. Such a marking indicates poor installation to a user, as will be seen hereinbelow.

At its other end, the prong 415 comprises locking means that engage with the support module 390 so as to prevent the translational movement of the pin 417 in the opening 413 into the anchoring position. Here, the locking means comprise a pair of hooks 415c that are positioned on each side of the central part 415a. During the insertion of the pin 417 into the opening 413, that is to say successively through the upper slot 416 and then the lower slot 414, these hooks 415c deform towards the interior of the prong 415. They recover their initial shape on leaving the opening 413, more specifically on leaving the lower slot 414, thereby locking the pin 417 in the anchoring position in the opening 413, as is the case in FIG. 8.

The semicylindrical shank 420 extends along the majority of the prong 415, in this case along around three quarters of its length. Such a value may of course vary. It will be noted in this respect that it may extend beyond the spacing between the lower arm 404 and the upper arm 406, as long as the lower arm 404 also has a semicircular notch. The semicylindrical shank 420 may also comprise a marking 424 over half of its surface, also so as to aid insertion of the pin 417 into the opening 413. Such a marking may consist of the attachment of a colour, of an alteration in the surface of the semicylindrical shank 420, or any other means for distinguishing this area from the rest of the semicylindrical shank 420.

During the insertion of the pin 417 into the opening 413, the semicylindrical shank 420 slides first against the inner surface of the semicircular notch 418. It then slides against the inner surface of one of the grooves 101, as will be seen hereinbelow.

FIG. 9 illustrates a variant of the first embodiment of the body of the support module. Specifically, for this support module 40, corresponding to the embodiment in FIG. 1, the pin 417 is identical to that in the first variant of the first embodiment. The body 450 still has a web 452, a lower arm 454 and an upper arm 456. However, the lower arm 454 does not have a hexagonal orifice, but only a lower slot 458, which does not otherwise have any difference from the lower slot 414 presented in the first variant. The upper arm 456 for its part does not have a hexagonal base, but retains an upper slot 459 without variation with respect to the upper slot 416. The lower slot 458 and upper slot 459, too, form an opening 460 intended to receive a pin 417.

As a complement to this upper slot 458, the upper arm 456 comprises a pin guide 461 projecting from its surface, on the side of the slot closest to the web 452. This pin guide 461 has a semicircular gutter 462. It also has two guide edges 464a and 464b extending, in a direction perpendicular to the extension of the upper arm 456, from and on either side of the gutter 462. Thus, the pin guide 461 carries out a function similar to that of the edge of the parallelepipedal projection 407 and the semicircular notch 418, that is to say of allowing the pin 417 to slide in contact therewith. In this variant, the means for securing supply systems 466 are carried by the web 452 which comprises a lateral hexagonal base 468 similar to the upper hexagonal base 409.

The anchoring of the support module 40 to the cross member 10 will now be described. For this purpose, reference will be made to FIGS. 10 to 14. These figures show a support module 40 as described in FIG. 4 and an assembly 500 for securing an aircraft supply system. Such a securing assembly comprises a hexagon head bolt 411 (in this case known under the designation NAS 1802), a spacer 505, a device 510 for holding the supply system (in this case a collar), a washer 520 and a nut 530.

The spacer 505 is a cylindrical element perforated in its centre, commonly used in the aeronautical field. It is known for example under the designation NSA5527. The use of the spacer 505 in the context of the securing assembly 500 is optional and serves in particular to space apart the collar 510 from the cross member 10, for example in order to maintain segregation distances linked with electrical insulation.

In some embodiments, it is quite conceivable not to use them or, by contrast, to slip (or stack) a plurality of spacers 505 onto one and the same hexagon head bolt 411. This stacking possibility is moreover one of the advantages of the mounting device according to the invention. Alternatively, in other embodiments, which are not shown, a succession of spacers 505 and collars 510 are slipped onto the bolt 411. For example, the securing assembly 500 comprises a second spacer 505 slipped onto the screw after a collar 510. A second collar 510 can then be slipped onto the bolt 411 after the second spacer 505.

Thus, with the aid of a succession of spacers 505 and collars 510, it is possible to position more than one collar 510 onto a support module 40. The collar 510 is an element commonly used in aeronautical applications in order to support wires, harnesses or strands; it will thus not be described in detail here. All that will be cited, by way of example, is the collar under the designation ABS1339.

The washer 520 and the nut 530 complete the securing assembly 500. They engage with the thread of the bolt 411 and thus make it possible to secure the collar 510 to the body 450, whether the spacer 505 is present or not. Specifically, it has previously been shown that the bolt body 411a is inserted through the lateral hexagonal base 468, in which its head 411b rests. Just like the collar 510, the washer 520 and the nut 530 do not have any particular features as far as the invention is concerned and are thus not described in detail here. In particular, use could be made of known washers of the type NAS1145 and bolts of the type ASNA2529.

The support module 40 is anchored on the cross member 10 in a simple and intuitive manner. Once the securing assembly 500 has been installed on the body 450 of the support module 40, the support module 40 is positioned on the cross member 10 such that the lower arm 454, the web 448 and upper arm 456 enclose three of the sides of the cross member 10 in the region of a groove 101.

Next, the pin 417 is inserted into the opening 460, in other words through the upper slot 459 and then the lower slot 458, the semicylindrical shank 420 sliding both in the pin guide 461 and in the groove 101. The insertion of the pin 417 into the opening 460 continues until the lip 415b comes into contact with a surface of the support module 40, in this case the free edge 469 of the upper arm 456.

The pin 417 is then in the anchoring position, as is the support module 40, the body 450 of which can no longer be moved in the direction of elongation of the cross member 10. In other words, the body 450 is immobilized on the cross member 10 without being able to move laterally. This is illustrated in FIGS. 12 and 14.

Figure 12:
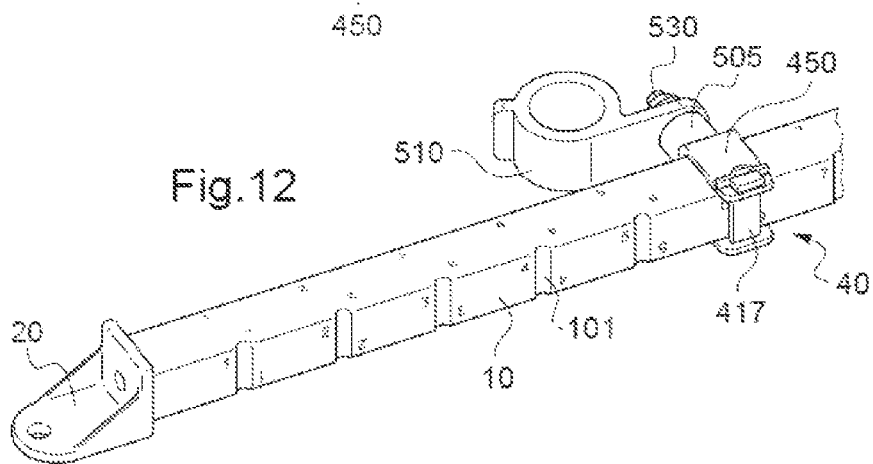
FIG. 12 is a schematic perspective illustration of a detail from FIG. 1.

Furthermore, by virtue of the action of the hooks 415c which recover their initial shape after their deformation in the lower slot 458, the pin 417 is locked along the groove 101, as can also be seen in FIGS. 12 and 14. In this embodiment, the pin 417 can no longer be removed from the opening 460 without being broken.

FIGS. 13 and 14 illustrate the advantage of the marking 424 present on the semicylindrical shank 420 of the pin 417. FIG. 13 shows incorrect anchoring of the support module 40 to the cross member 10. "Incorrect" is understood here to mean mounting in which the pin 417 does not lock the body 450 to the cross member 10, or in other words the fact that the pin 417 has not passed right through the body 450 when passing through the opening 460. More specifically, incorrect mounting of the support module 40 corresponds to the case in which the hooks 415c have not passed right through the lower slot 458. In such a situation, the marking 424 becomes visible. Thus, a user such as a fitter or handler is given visual information indicating the poor position of the support module 40.

In the opposite case, in the case of correct mounting, that is to say completely secure anchoring of the support module 40 to the cross member 10, as illustrated in FIG. 14, the marking 424 is not visible because it is located inside the opening 460.

Figure 16:
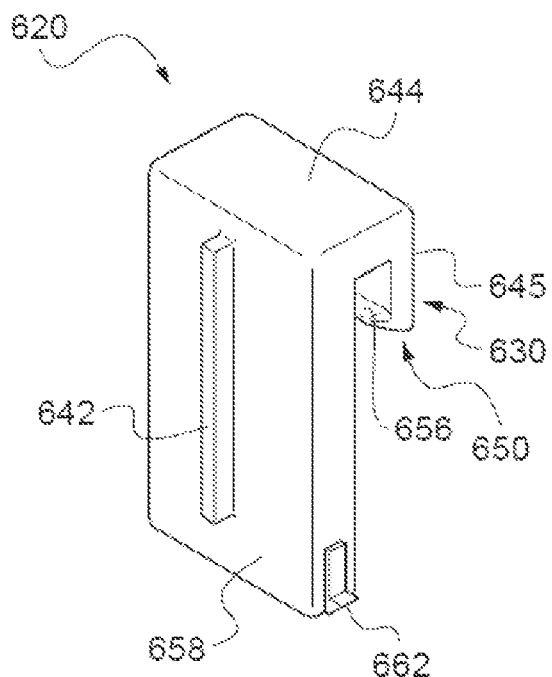
FIG. 16 is a schematic perspective illustration of a pin in a second embodiment according to the invention.
Figure 17:
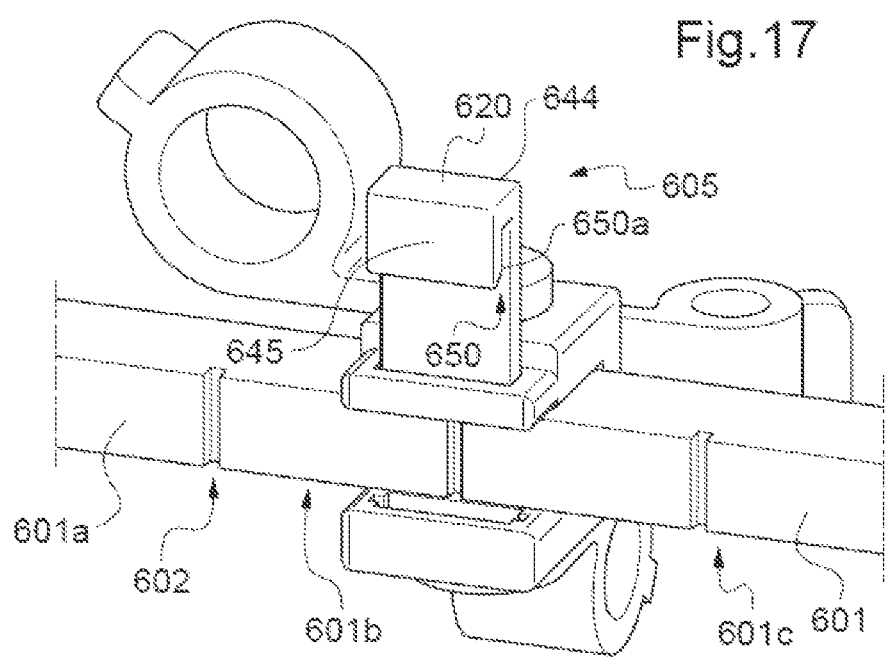
FIG. 17 is a schematic perspective illustration of a mounting device in a second embodiment according to the invention.

A second embodiment of the mounting device according to the invention will now be described with reference to FIGS. 15 to 17. In this second embodiment, the cross member 601 is identical to the cross member 10 except for the shape of its grooves 602, which no longer have a semicircular section, but rather a rectangular section. The support module 605 for its part still comprises a body 610 in the form of a jaw around the cross member 601, and a pin 620.

The body 610 of the support module 605 is similar to the one in the first embodiment, since it comprises a base 622, a lower arm 624, an upper arm 626 in the form of a C, and an opening 628 formed by an upper opening 630 and a lower opening 632 intended to receive the pin 620. By contrast, the shape of the straight notch 640 of the body 610 for receiving the pin 620 will be distinguished. This straight notch 640 no longer has a semicircular section, but rather a rectangular section.

Specifically, the pin 620 has a straight shank 642 having a rectangular section which is intended, just as was the case for the semicylindrical shank in the semicircular notches, to slide in the straight notch 640 during the mounting of the module 605 on the cross member. Moreover, the pin 620 has a return 644 projecting in a normal manner from a lip 645 identical to that of the pin 417. This return 644 has, at its end opposite the first return 645, a hook 650.

During the insertion of the pin 620 into the opening 628 of the body 610, the hook 650 is compressed, in the region of its edge 650a, against the first face 601a of the cross member in which the grooves 602 are located. Next, once the opening 628 has been passed through, the hook 650 returns to its initial shape in the region of the edge 601b located between the face 601a of the cross member 601 and the second face 601c perpendicular thereto. In this anchoring position, the upper surface 656 of the hook 650 is thus located against the second face 601c of the cross member 10. More specifically, all of the surface 656 of the hook is in surface-to-surface contact with the second face 601c. The module 605 can no longer be moved vertically (in the direction perpendicular to the longitudinal extent of the cross member 10).

In order to prevent lateral translational movement (in the direction of longitudinal extent of the cross member) of this same pin 620 in the opening 628, this pin has, at the end of its prong 658 opposite the first return 645, locking means in the form of hooks 662 in the region of each of its edges 660. Such hooks 662 have a similar function to the hooks 451c of the first embodiment. Therefore, they will not be described a second time.

All that will be noted is that, since they are positioned at the edges 660 of the prong 658, the hooks 662 reduce the space requirement of the pin 620. In addition, on account of their position, they are less exposed to damage. As far as the means for securing the supply system are concerned, they are in this case similar to those in the variant of the first embodiment.

A third embodiment of the mounting device according to the invention will now be described with reference to FIGS. 18 and 19. In this embodiment, the support module 700 has a body 710 suitable for securing supply systems in an alternative manner. Only this aspect will be described in this respect, since the anchoring of the body 710 to a cross member is not different from that of the second embodiment of the invention. The body 710 still has a base 712, a lower arm 714, an upper arm 716 forming the jaw, and an opening 718 formed by an upper opening 720 and a lower opening 722 intended to receive a pin 724.

However, the base 712 comprises, at its four corners and starting from each of these corners, a lateral lug 730 having an approximately square shape. These four lateral lugs 730 form, as can be seen in FIG. 17, two front gaps 732 which have the function of immobilizing the securing lug 734 of a collar 740 when this securing lug 734 is in contact with the base 712. Similarly, the lower arm 714, and also the upper arm 716, each have, at their end opposite the base 712, two lateral blocking means 742 that form rear gaps 744. These rear gaps 744 have the function of immobilizing the securing lug 734 of a collar 740 when said securing lug 734 is in contact with the upper arm 716 or lower arm 714.

The advantage of such an embodiment is that of allowing three collars 740 to be secured to one and the same support module 700 in a manner rotated through 90° with respect to one another. In order to secure these collars 740, the base 712, the upper arm 716 and the lower arm 714 each have a centring pin 745.

A fourth embodiment of the mounting device according to the invention will now be described with reference to FIG. 20. In this embodiment, the body 810 of a support module is suitable for securing supply systems in yet another alternative manner. Only the latter aspect will be described in this respect, since the anchoring of the body 810 to a cross member is not different from that of the second and third embodiments of the invention. The body 810 also has a base 812, a lower arm 814, an upper arm 816 forming the jaw, and an opening 818 formed by an upper opening 820 and a lower opening 822 intended to receive a pin.

By contrast, only the base 812 has means 824 for securing an aircraft supply system. Said means may in particular be extruded from the mass of the base 812 or be secured to the latter by welding or else adhesively bonded, depending on the material from which it is produced. These securing means 824 are in the form of a structure 826 for directly accommodating the supply pipe, strand, harness or wire on a rail 828. The structure 826 furthermore has, on each of its faces 830, a passage 832 having a rectangular section and intended for the passage of cable ties, for example cable ties, for locking the supply systems in place.

It will be noted that in the preceding description, all the embodiments presented have a module adapted to the particular shape of cross member which has a rectangular section. However, the examples which have just been described are only possible embodiments of the invention, which is not limited thereto. Specifically, other embodiments which are not shown and in which the cross member and the modules can have a different shape also fall within the scope of the invention. For example, the invention also applies in the case of a cross member having a circular section, wherein the body of the module can cover a C shape, or, in the case of a cross member having a triangular section, a V shape.

The invention claimed is:

1. A device comprising:
    an elongated cross member, the cross member includes shaped grooves, said grooves spaced apart in an elongation direction of said cross member; and
    at least one support module, said support module comprising a body having a shape complementary to a cross section of the cross member, wherein the body includes a securing element configured to be secured to an aircraft supply system, a channel to receive the cross member and an opening proximate to an open end of the channel, and
    an elongated pin, wherein the opening of said body receives at least a portion of the pin thereby closing the opening, the pin having a cross sectional shape complementary to the shaped grooves in said cross member, said pin having a lip transverse to the elongation direction of the pin, wherein said support module is anchored to the cross member by the pin at least partially inserted into the opening, where at least a portion of the cross-sectional shape of said pin engages with a portion of one of the shaped grooves when the lip contacts the support module and wherein the at least one support module and elongated pin extends entirely around a perimeter of the cross member while the lip contacts the support module.

2. The mounting device according to claim 1, wherein the pin includes a lock configured to engage the support module preventing translational movement of the pin in the opening out of an anchoring position.

3. The mounting device according to claim 1, wherein said at least one support module includes a plurality of the securing element.

4. The mounting device according to claim 1, wherein the securing element comprises a structure projecting from the body and forming a guide for said aircraft supply system.

5. The mounting device according to claim 1, wherein the cross member comprises an outer layer produced from materials which are not electrically conductive.

6. The mounting device according to claim 1, wherein the cross member is produced by pultrusion.

7. An aircraft including a mounting device according to claim 1.

8. A mounting device comprising:
    an elongated cross member, the cross member includes shaped grooves, said grooves spaced apart in an elongation direction of said cross member; and
    at least one support module, said support module comprising a body having a shape complementary to a cross section of the cross member, the body including a securing element configured to secure the at least one support module to an aircraft supply system, and an opening;
    an elongated pin, wherein the opening of said body receives at least a portion of the pin thereby closing the opening, the pin having a cross sectional shape complementary to the shape of the grooves in said cross member, said pin having a lip transverse to the elongation direction of the pin, wherein said support module is anchored to the cross member by the pin at least partially inserted into the opening, where at least a portion of the cross sectional shape of said pin engaging with a portion of one of the grooves when the lip is fully in contact with the support module; and
    a lock configured to prevent translation movement of the support module preventing translational movement of the pin in the opening out of an anchoring position comprises a pair of flexible hooks located at one end of the pin, said hooks configured to deform during insertion of the pin into the opening and to return to their initial shape upon complete insertion of the pin into the opening.

9. A mounting device comprising:
    an elongated cross member, the cross member includes shaped grooves, said grooves spaced apart in an elongation direction of said cross member;
    first and second end pieces respectively engaging ends of the cross member, each end piece including a hole for securing each end piece to a structural element of the aircraft, the hole in one of said first and second end pieces is circular and the hole in the other of said first and second end pieces is elongate;
    at least one support module comprising a body having a shape complementary to a cross section of the cross member, the body including a securing element configured to be secured to an aircraft supply system, and an opening, and
    an elongated pin, wherein the opening of said body receives at least a portion of the pin thereby closing the opening, the pin having a cross sectional shape complementary to the shape of the grooves in said cross member, said pin having a lip transverse to the elongation direction of the pin, wherein said support module is anchored to the cross member by the pin at least partially inserted into the opening, where at least a portion of the cross-sectional shape of said pin engaging with a portion of one of the grooves when the lip is fully in contact with the support module.

10. A mounting device comprising
an elongated cross member including shaped grooves spaced apart in an elongation direction of said cross member, wherein with the elongated cross member has a rectangular cross section;
at least one support module, said support module comprising a body having a shape complementary to the rectangular cross section of the cross member, the body includes a securing element configured to be secured to an aircraft supply system, and an opening, wherein the body includes a base from which two arms extend forming an approximate C shape; and
an elongated pin, wherein the opening of said body receives at least a portion of the pin thereby closing the opening, the pin having a cross sectional shape complementary to the shape of the grooves in said cross member, said pin having a lip transverse to the elongation direction of the pin, wherein said support module is anchored to the cross member by the pin at least partially inserted into the opening, where at least a portion of the cross-sectional shape of said pin engaging with a portion of one of the grooves when the lip is fully in contact with the support module.

11. The mounting device according to claim 10, wherein the opening passes through the arms of the body.

12. A mounting device comprising:
an elongated cross member including shaped grooves spaced apart along an elongation direction of said cross member;
at least one support module comprising a body having a shape complementary to a cross section of the cross member, wherein the body includes an opening and a securing element configured to attach the body to an aircraft supply system, wherein the securing element includes:
at least one perforation;
at least one threaded fastener extending through said at least one perforation; and
at least one intermediate device for holding said aircraft supply system, slipped onto said at least one threaded fastener, and
an elongated pin, wherein the opening of said body receives at least a portion of the pin thereby closing the opening, the pin having a cross sectional shape complementary to the shape of the grooves in said cross member, said pin having a lip transverse to the elongation direction of the pin, wherein said support module is anchored to the cross member by the pin at least partially inserted into the opening, where at least a portion of the cross-sectional shape of said pin engaging with a portion of one of the grooves when the lip is fully in contact with the support module.

13. The mounting device according to claim 12, wherein the intermediate device for holding said aircraft supply system is a clamping collar.

14. The mounting device according to claim 12, wherein a plurality of intermediate devices for holding aircraft supply systems are slipped onto said at least one threaded fastener.

* * * * *